L. G. BARTLETT.
CARRIER FOR PNEUMATIC DESPATCH TUBE APPARATUS.
APPLICATION FILED NOV. 30, 1908.
1,032,178.
Patented July 9, 1912.
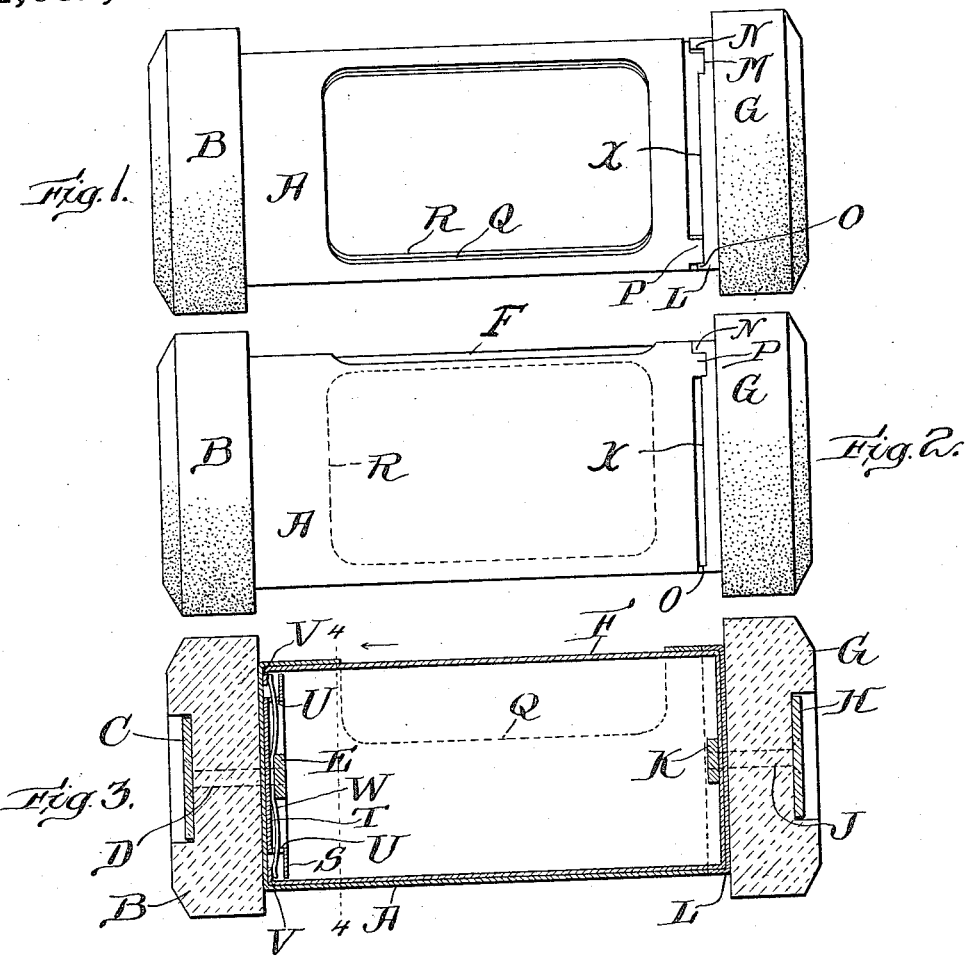
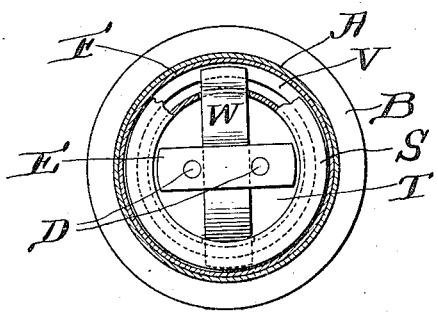
Witnesses:
Arthur F. Randall
H. C. Bowser
Inventor:
Louis G. Bartlett

UNITED STATES PATENT OFFICE.

LOUIS G. BARTLETT, OF SOMERVILLE, MASSACHUSETTS, ASSIGNOR TO LAMSON CONSOLIDATED STORE SERVICE COMPANY, OF NEWARK, NEW JERSEY, A CORPORATION OF NEW JERSEY.

CARRIER FOR PNEUMATIC-DESPATCH-TUBE APPARATUS.

1,032,178. Specification of Letters Patent. Patented July 9, 1912.

Application filed November 30, 1908. Serial No. 465,356.

*To all whom it may concern:*

Be it known that I, LOUIS G. BARTLETT, of Somerville, in the county of Middlesex and State of Massachusetts, have invented certain new and useful Improvements in Carriers for Pneumatic-Despatch-Tube Apparatus, of which the following is a specification.

My invention relates to improvements in carriers for pneumatic despatch tube apparatus and its object is to provide a simple and effective device for locking the carrier closed, thereby preventing the accidental opening of the carrier and the spilling of its contents during the transit or delivery thereof. The device also serves to limit the rotation of the shells of the carrier to the proper opening and closing of the same and also permits sufficient longitudinal movement of the same to enable the operator to unlock the carrier by merely grasping the buffers as is usually done to open the same.

In the accompanying drawings is illustrated a construction embodying the device in which—

Figure 1 shows the carrier in open or unlocked position. Fig. 2 is a similar view showing the carrier locked closed. Fig. 3 is a central longitudinal section through the same. Fig. 4 is a section on line 4—4 Fig. 3 looking in the direction indicated by the arrow.

Like letters of reference refer to like parts throughout the several views.

A represents the usual outer cylindrical shell having the peripheral opening Q therein, and F′ the inner or telescoping shell having the peripheral opening R adapted upon the relative rotation of the shell to coöperate with the opening Q to permit the insertion of articles.

S is a plate, the outer rim of which fits closely within the inner shell F and which plate is secured to the inner side of the closed end of the outer shell A by means of bolts D and nut E. The buffer B is also secured to the outer shell A by means of said bolts D the washer C preventing the bolts from tearing through the buffer. The open end of the inner shell F carries an internal flange V which is adapted to engage after a limited longitudinal movement with the outer rim of plate S thereby preventing the separation of the shells.

The spring W is mounted in the cup shaped depression T of plate S and is rigidly secured therein by nut E. The outer ends of said spring W project through opening or slots U in plate S and engage the flange V normally holding the shells A and F in the relative or locking position shown in Figs. 2 and 3.

L is a flanged plate fitting over the closed end of the inner shell F and which with buffer G is secured thereto by washer H bolts J and nut K. The flange of plate L carries a recess or notch M into which the projection or lock P carried by the outer shell A is normally held by tension of spring W locking the carrier closed. The projection or lock P when out of engagement with recess M is adapted to coöperate with a recess not quite so deep as recess M thereby permitting the movement of said lock P between stops N and O and limiting the rotation of the shells A and F to the proper opening and closing of the carrier.

The operation of the carrier is as follows: To unlock the carrier from the position as shown in Fig. 2 to permit the removal of the contents, the operator grasps the buffer B with one hand and the buffer G with the other hand in the usual manner, and by imparting a telescopic or outward movement to the shells A and F the flange V is pressed against the tension of spring W until said flange engages the plate U preventing farther separation of the shells A and F, and throwing the lock or projection P out of engagement with the recess M. The shells A and F are now rotated in the usual manner until the opening R registers or coöperates with the opening Q and the lock or projection P has moved to one end of the recess X and engaged the stop O preventing further rotation of the shells, (see Fig. 1). The contents of the carrier may now be removed. If the carrier is to be again despatched the articles are inserted therein and the operator grasping the buffers of the carrier rotates the shells A and F until the openings R and Q are closed and the lock P engages the stop N and is snapped into engagement with the recess M (see Fig. 1) by means of the tension of spring W acting against flange V. The carrier is now securely locked closed and the articles cannot be removed until opened again by the operator in the manner heretofore described.

Having thus described the nature of my invention and set forth a construction embodying the same, what I claim as new and desire to secure by Letters Patent of the United States is:

1. In a carrier for pneumatic despatch tube apparatus, a pair of relatively rotatable cylindrical shells one having a telescopic movement relative to the other, each shell having an opening therein, said openings adapted to coöperate or non-coöperate upon the relative rotation of said shells, means for locking said shells against rotation and adapted to be operated by a telescopic movement of said shells to release the same and a spring to normally prevent the telescopic movement of said shells.

2. In a carrier for pneumatic despatch tube apparatus, a pair of telescopic relatively rotatable cylindrical shells, each shell having an opening therein, said openings adapted to coöperate or non-coöperate upon the relative rotation of said shells, means for locking said shells against rotation with said openings in non-coöperation, said locking means adapted to limit the rotation of said shells to the coöperatoin or non-coöperation of said openings.

3. In a carrier for pneumatic despatch tube apparatus, a pair of shells one rotatable within the other, and locking means adapted to be operated independently of the rotation of said shells to lock or release said shells and to limit the rotation of same in either direction.

4. In a carrier for pneumatic despatch tube apparatus, a pair of shells one rotatable within and having a telescopic movement relative to the other, and locking means adapted to be operated by a telescopic movement of said shells to prevent or permit the relative rotation of said shells and to limit the telescopic movement of the same.

5. In a carrier for pneumatic despatch tube apparatus, a pair of shells one rotatable within and having a telescopic movement relative to the other, an opening in each of said shells adapted to coöperate or non-coöperate upon the relative rotation of said shells, and locking means adapted to be operated by a telescopic movement of said shells to prevent or permit the relative rotation of the same.

6. In a carrier for pneumatic despatch tube apparatus, a pair of shells one rotatable within and having a telescopic movement relative to the other, an opening in each of said shells adapted to coöperate or non-coöperate upon the relative rotation of said shells, and locking means adapted to be operated by a telescopic movement of said shells to prevent or permit the relative rotation of the same and to limit said rotation.

7. In a carrier for pneumatic despatch tube apparatus, a pair of shells one rotatable within and having a telescopic movement relative to the other, an opening in each of said shells adapted to coöperate or non-coöperate to open and close said carrier, and yielding means for locking said carrier closed and adapted to be operated by a telescopic movement of said shells for releasing the same to permit the opening thereof.

In testimony whereof I have affixed my signature, in presence of two witnesses, this 28th day of November, A. D. 1908.

LOUIS G. BARTLETT.

Witnesses:
HERMANN C. BOWSER,
ARTHUR F. RANDALL.

Copies of this patent may be obtained for five cents each, by addressing the "Commissioner of Patents, Washington, D. C."